J. R. HUETHER & H. M. SIMMONS.
PUMP.
APPLICATION FILED SEPT. 15, 1911.

1,048,410.

Patented Dec. 24, 1912.

Witnesses
Fenton S. Belt
J. R. Pierce

Inventors
J. R. Huether and
H. M. Simmons
by H. B. Wilson & Co.
Attorneys

UNITED STATES PATENT OFFICE.

JOHN R. HUETHER AND HARLEY M. SIMMONS, OF QUINCY, WASHINGTON.

PUMP.

1,048,410.  Specification of Letters Patent.  Patented Dec. 24, 1912.

Application filed September 15, 1911. Serial No. 649,467.

*To all whom it may concern:*

Be it known that we, JOHN R. HUETHER and HARLEY M. SIMMONS, citizens of the United States, residing at Quincy, in the county of Grant and State of Washington, have invented certain new and useful Improvements in Pumps; and we do declare the following to be a full, clear, and exact description of the invention, such as will enable others skilled in the art to which it appertains to make and use the same.

This invention relates to improvements in balanced double acting multiple cylinder pumps for deep wells.

One object of the invention is to provide a pump of this character having an improved construction and arrangement of working parts whereby the power required to operate the pump is only such as is necessary to lift the volume of water discharged at each stroke of the pistons of the pump.

With these and other objects in view the invention consists of certain novel features of construction, and the combination and arrangement of parts as will be more fully described and claimed.

Figure 1:
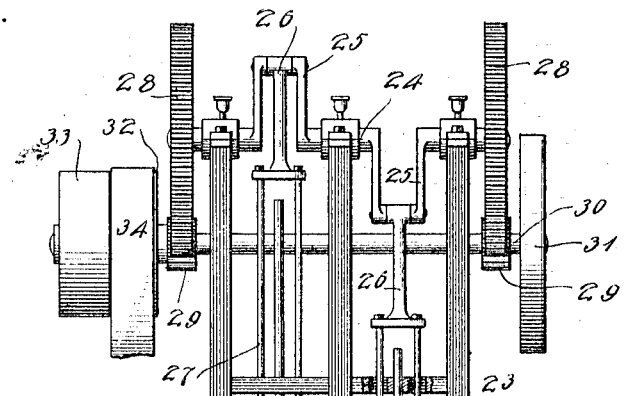
Figure 2:
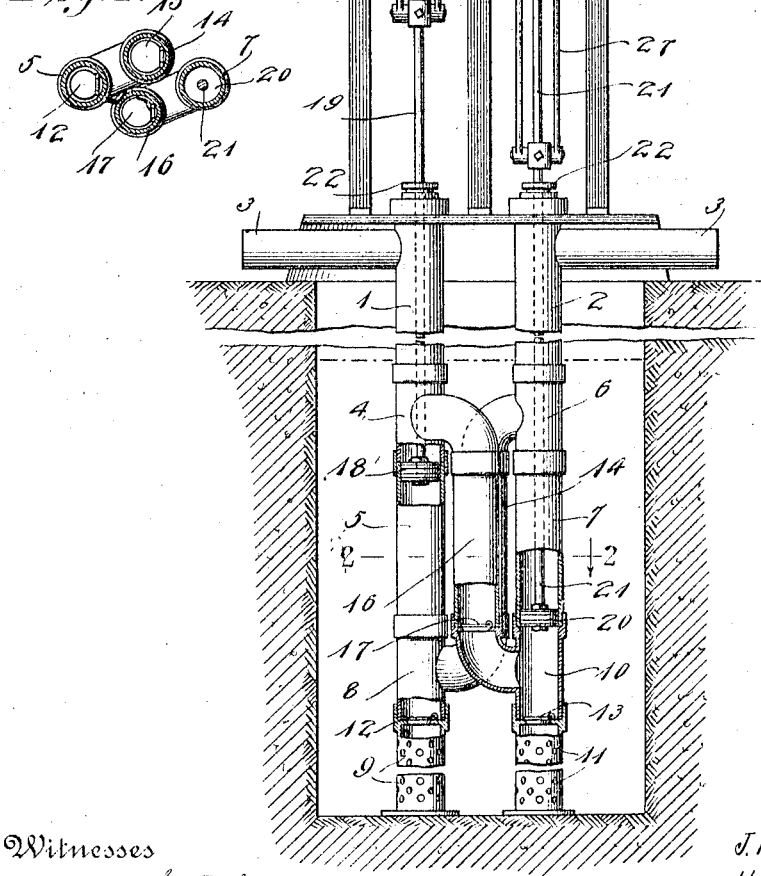

In the accompanying drawings: Figure 1 is a side view of our improved pump, parts being broken away and in section; Fig. 2 is a cross sectional view on the line 2—2 of Fig. 1.

Referring more particularly to the drawings, 1 and 2 denote water discharging pipes which are arranged in the well and have connected to their upper ends branch conducting or distributing pipes 3. The lower end of the pipe 1 is connected by a T coupling 4 with a pump cylinder 5 while the pipe 2 is connected by a T coupling 6 with a pump cylinder 7. The pump cylinder 5 is connected at its lower end by a T coupling 8 with a perforated water inlet pipe 9 which extends to the bottom of the well and the cylinder 7 is connected by a T coupling 10 with a perforated water inlet pipe 11 which also extends to the bottom of the well. In the upper ends of the water inlet pipes 9 and 11 are respectively arranged intake check valves 12 and 13. The T coupling 8 of the cylinder 5 is connected by a branch discharge pipe 14 with the T coupling 6 of the cylinder 7 and main discharge pipe 2 and in the T coupling at the lower end of the branch pipe 14 is arranged a check valve 15. The T coupling 10 of the cylinder 7 is connected by a branch discharge pipe 16 with the T coupling 4 which connects the upper end of the cylinder 5 with the main discharge pipe 1. In the T coupling 10 at the lower end of the branch discharge pipe 16 is arranged a check valve 17.

Slidably mounted in the pump cylinder 5 is a solid piston 18 to which is connected an upwardly extending piston rod 19. Slidably mounted in the pump cylinder 7 is a solid piston 20 to which is connected a piston rod 21. The piston rods 19 and 21 extend upwardly through the main discharge pipes 1 and 2 and pass through stuffing boxes 22 arranged in the upper end of said pipe. The upper ends of the piston rods 19 and 21 are operatively connected with a suitable pump jack which is here shown and preferably comprises a frame 23 in the upper end of which is revolubly mounted a crank shaft 24, the cranks 25 of which project in opposite directions as shown. The cranks 25 have operatively engaged therewith pitman rods 26 which are hingedly and adjustably connected by yokes 27 to the piston rods 19 and 21 whereby the latter and the pistons 18 and 20 are reciprocated. On the ends of the crank shaft 24 are fixedly mounted spur gears 28 which are operatively engaged with driving pinions 29 fixed on a counter shaft 30 operatively mounted on the frame 23. On one end of the shaft 30 is fixedly mounted a fly wheel 31 while on the opposite end of said shaft are mounted tight and loose driving pulleys 32 and 33 with which is adapted to be engaged a driving belt 34 whereby the pump may be operated by any suitable power.

In the operation of the device the pistons 18 and 20 are alternately raised and lowered in their respective cylinders by the operating mechanism herein described. When thus operated the piston 18 will, on its up stroke lift the valve 12 in the upper end of the intake pipe 9 and will draw the water through said pipe 9 up into the cylinder 5. At the same time that the piston 18 is thus drawing the water into the cylinder 5 the piston 20 is being forced down by the operating mechanism on its down stroke. In thus moving down the piston 20 will force the water which has been previously drawn up into the cylinder 7 out through the T coupling 10 past the check valve 17 through the branch discharge pipe 16 into the main discharge pipe 1 thus lifting or forcing upwardly the water already in the discharge pipe 1 and discharging a portion of the same through the outlet or distributing pipe 3 connected with the upper end thereof. In the same manner the valve 18 on its down stroke will force the water which it has previously drawn up into the cylinder 5 out through the T coupling 8 past the check valve 15 therein through the branch discharge pipe 14 into the main discharge pipe 2 whereby the water in said pipe is lifted and discharged from the outlet or distributing pipe 3 connected to the upper end of this pipe.

It will thus be seen that by the construction and arrangement of the parts of the pump proper the same is adapted to be entirely submerged within the water contained in a well or reservoir and, therefore, the pistons are at all times under the surface of the volume of water. On the down stroke of the piston 18 the water will be forced from the pulsation chamber 8 into the conduit 2 against a resistance due to the column of water contained therein, this being the only resistance, and the latter can be greatly overcome by the velocity of the operating mechanism of the pump and the diameter of the conduits 1 and 2 as compared with the diameter of the cylinders. It is clearly obvious that by increasing the size of the discharge pipes 1 and 2 the friction due to the velocity of the water passing therethrough is greatly diminished, and during the operation of the pump the water in discharge pipe 1 descends at one-half the speed that the water in discharge pipe 2 rises and that this speed or force is only the difference of friction of the discharges due to the speed or velocity of the water.

From the foregoing description taken in connection with the accompanying drawings, the construction and operation of the invention will be readily understood without requiring a more extended explanation.

Having thus described our invention what we claim is:

A pump of the character described, comprising a pair of water distributing stand pipes, an independent laterally disposed distributing pipe extending from each of the same, intermediately arranged piston cylinders, T-shaped couplings secured to the lower ends of the piston cylinders, perforated water inlet pipes secured to the lower ends of said couplings, the lower closed ends of which rest upon the bottom of the well for supporting the entire structure, T-shaped couplings connecting the upper ends of the piston cylinders with the stand pipes, branch cylinders connecting the laterally disposed ends of the coupling, said cylinders having no connection with each other and oppositely disposed but located adjacent to one another and to the piston cylinder, the opposite ends of the branch cylinders respectively connecting a coupling of one section with the coupling of the other, check valves arranged in the upper ends of the water inlet pipes above the perforations therein, a valve arranged within each of the laterally disposed extensions of the lower couplings adjacent to the lower connected ends of the branch pipes, pistons slidably located in the piston cylinders, rods secured to the pistons and passing through the water discharge stand pipes, vertical portions of the upper couplings and stand pipes and projecting above the lateral water distributing pipes, and means for reciprocating said piston rods, whereby the pistons will be substantially on a line with the valves in the lower couplings and above the valves in the perforated water inlet pipes located in their lowest position, whereby uninterrupted discharge passages are formed from said last named valves to the distributing pipes.

In testimony whereof we have hereunto set our hands in presence of two subscribing witnesses.

JOHN R. HUETHER.
HARLEY M. SIMMONS.

Witnesses:
G. E. SANDERSON,
JULIUS IRMER.